United States Patent [19]
Boisen

[11] Patent Number: 4,607,435
[45] Date of Patent: Aug. 26, 1986

[54] TEMPERATURE COMPENSATED EXTENSOMETER

[75] Inventor: Bradford P. Boisen, Millcreek, Wash.

[73] Assignee: The Slope Indicator Company, Seattle, Wash.

[21] Appl. No.: 701,995

[22] Filed: Feb. 15, 1985

[51] Int. Cl.⁴ .................................................. G01B 7/26
[52] U.S. Cl. .................................... 33/125 B; 33/1 H; 33/125 T; 374/196
[58] Field of Search ............. 33/125 B, 125 T, 125 R, 33/1 H; 73/154; 374/136, 187, 196, 188

[56] References Cited

U.S. PATENT DOCUMENTS

| | | | |
|---|---|---|---|
| 1,217,601 | 2/1917 | Housholder | 374/196 |
| 3,460,258 | 8/1969 | Geary et al. | 33/1 H |
| 3,562,916 | 2/1971 | Duckworth | 33/125 B |
| 3,828,435 | 8/1974 | Baker | 33/125 B |
| 3,942,380 | 3/1976 | Lorenzo | 374/196 |

FOREIGN PATENT DOCUMENTS 3599 of 1879 United Kingdom ................ 374/196

Primary Examiner—William D. Martin, Jr.
Attorney, Agent, or Firm—Garrison & Stratton

[57] ABSTRACT

A temperature-compensated borehole extensometer comprises a coaxial remotely anchored assembly of a rod and tube formed of materials having disparate linear coefficients of expansion, said assembly being associated with comparator transducers sensitive to relative linear movement of the rod and tube components under the influence of temperatures.

15 Claims, 6 Drawing Figures

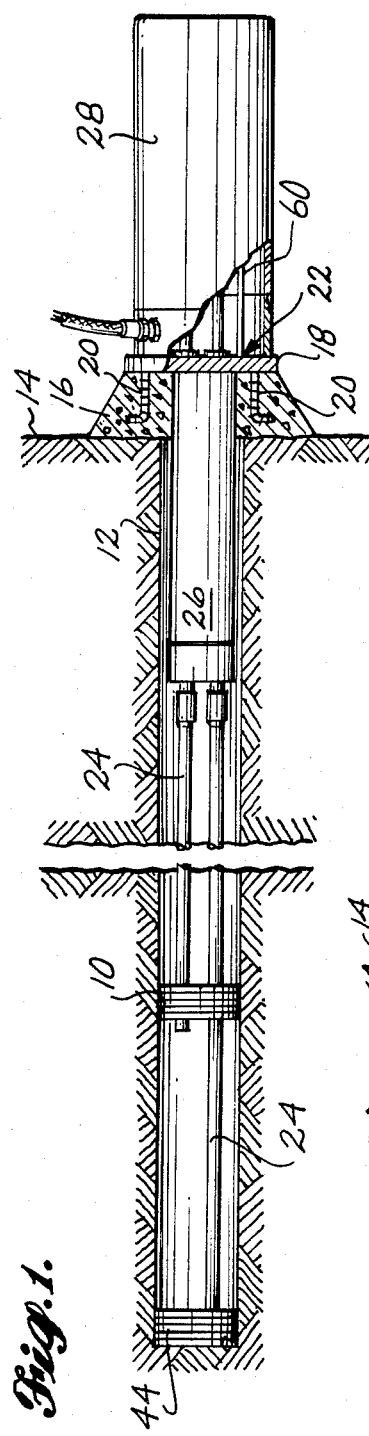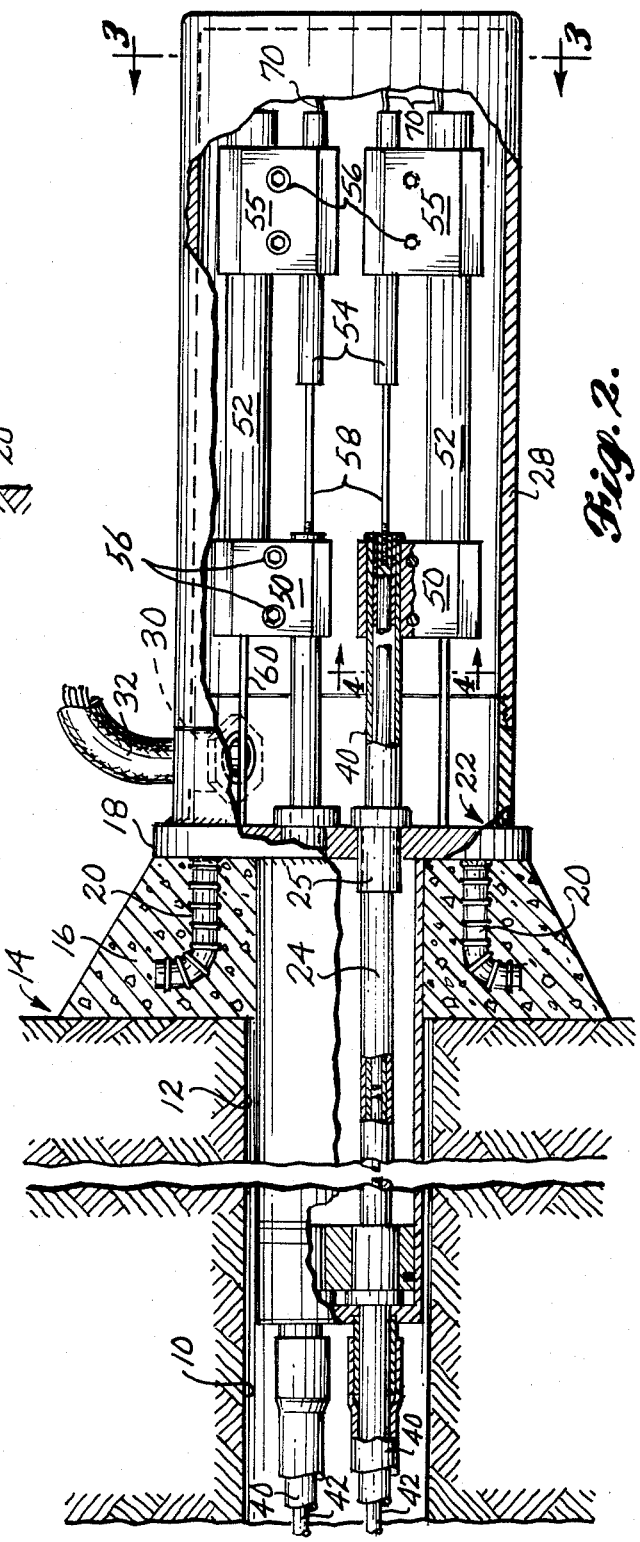

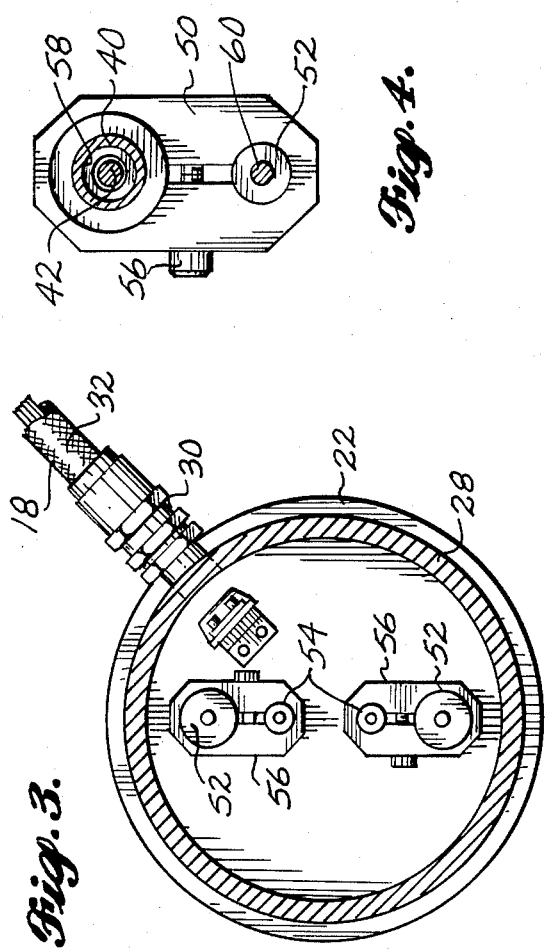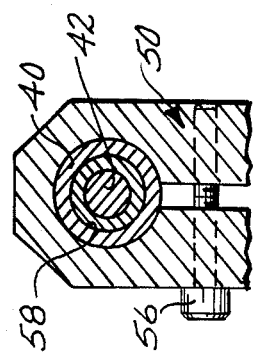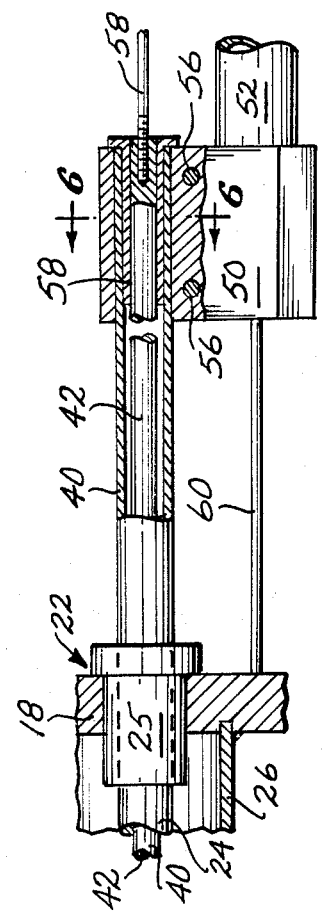

TEMPERATURE COMPENSATED EXTENSOMETER

BACKGROUND OF THE INVENTION

When rock or soil mass of the earth is disturbed, either by natural events or by the activities of man, it undergoes a redistribution of stress, accompanied by a change of shape. The change of shape may produce undesirable effects such as failures of slopes, cave-ins of mine tunnels, damage to other underground structures, and leakage from reservoirs, empoundments, and toxic or nuclear waste repositories. Changes of shape are often considered as deformations or displacements and represent complex effects acting over substantial and significant distances often up to hundreds or even thousands of feet. They are materially different from strain which is most often considered to be an effect acting over some finite distance, usually very short. Strain usually comprises the effect as related to a single structural element as detected between two connections or two discontinuities or the like.

The sources of disturbances are typically associated with the excavation of material as by the removal of lateral support, changes in the operating loads as where structures are subjected to reservoir weights or traffic loads, and the occurrence of heat as, for example, can occur with radioactive waste repositories. Heat, which is a principal source of disturbance in repository operation, is also a secondary factor in other applications to the extent that temperature variations produce low levels of deformation, i.e., change of shape, which cannot always be distinguished from those changes produced by loading or by the removal of lateral support.

The stress redistribution produced by disturbances may not usually be measured directly. The deformation e.g. a change of shape, on the other hand can be measured reliably, using general techniques which have established precedents and wide acceptance.

For the effective measurement of very small amounts of deformation, however, temperature changes become a significant source of error, sometimes to the extent that such errors substantially conceal important and otherwise measurable deformation.

Conventional extensometers of the rod or wire type have been used to measure axial strain in a borehole in rock. They are materially distinguishable from devices that measure effects on structure transverse of the instrument, as in strain gauges. Where the temperature of the rock mass is being raised, some systems suffer from the effects of thermal expansion of the rod or wire. A string of thermocouples are usually installed with the extensometer and regular temperature readings must be taken throughout the life of the extensometer so that the total thermal expansion of the rods can be calculated to separate out any strain component.

In the past, it has been necessary to attempt to correct for the effects of temperature changes by either fabricating deformation measuring equipment of materials with low coefficients of thermal expansion (INVAR, etc.) and assuming them to be unaffected by temperature changes, or by designing the instrument in such a way that the temperature effects on the various components can be calculated, and the deformation data adjusted accordingly. The problems involved in these approaches are as follows: (1), the desirable properties of low temperature coefficient materials are often lost if temperatures exceed certain limits, sometimes limits which are well within potential operating ranges; (2), calculated corrections require that accurate temperature data be available over the entire physical extent of the measuring device or devices, a costly, frequently impractical, and sometimes imposssible consideration.

PRIOR ART STATEMENT

The following prior U.S. patents disclose borehole extensometers:

| | | | |
|---|---|---|---|
| 3,380,167 | 4/1968 | Abel, Jr. et. al | 33–125 |
| 3,404,460 | 10/1968 | Livingston et. al. | 33–125 |
| 3,416,230 | 12/1968 | Oleson et. al. | 33–1 |
| 3,483,745 | 12/1969 | Ublacker | 73–151 |

Ublacker discloses the use of a measuring wire extending from the drill hole axially through the length of the measuring element in the head. Temperature effects measured in the head only are automatically compensated where the wire and the element are of materials having the same relative coefficients of the thermal expansion. In such apparatus it is usual to assume that temperatures in the drill or borehole are substantially constant and it is the head at surface which is subjected or exposed to the more serious temperature effects. The Abel, Jr. and Livingstone et al. instruments provide only casual temperature compensation at the head only. Oleson et al. discloses an instrument having some compensation of the head section only inside the borehole. In such systems where temperature compensation is provided, it is restricted to the head which usually comprises less than one percent of the total length of the extensometer. The remaining length of the system is uncompensated, thus being vulnerable to errors over the very substantial uncompensated length of the instrument.

SUMMARY OF INVENTION

As disclosed herein, the present invention is generally concerned with apparatus for effectively measuring actual or potential complex rock and soil mass deformations or displacements as may be determined from elevated or variable borehole temperatures. The apparatus comprises an elongated heat-responsive element formed of a tube having a rod coaxially disposed therein. The tube and rod are distally secured together and the element they comprise is anchored at its distal or downhole end in the borehole. This extensometer is designed for use in deep or extremely long boreholes which usually are in the hundreds if not thousands of feet in length. The boreholes may or may not be lined with a casing as the earth's structure may require.

It is important that the tube and rod be formed of selected materials having disparate linear coefficients of expansion. The heat-responsive element must have freedom of movement outward from its distal anchor. And the components of the element, the tube and rod, must also have freedom of movement relative each other.

It is preferable that there be a sizeable or sensible difference in the linear coefficients of expansion to produce effective movement of the two components relative each other. While it is thought desirable at this time to provide a tube having an appreciably great expansion coefficiently than the rod, no reason is seen to not reverse the order and employ a rod expansible to a greater degree than the tube. For accuracy reasons, the length of the rod should be identical with the length of the tube or, if not identical, the actual length should be known in advance. This facilitates association with the outer ends of these components of a pair of transducers employed in detecting and measuring thermally-induced changes in their overall lengths.

In relatively close proximity to the outer end of the borehole is provided means forming a reference surface or base. A first transducer fixed to the tube of the composite element in parallel disposition is a probe associated with the reference surface. A second transducer is fixedly coupled to the first transducer and has a probe associated with the outer extremity of the coaxially located rod to sense any linear expansion of either component relative the other. The first transducer senses the thermal linear displacement of the tube together with any displacement of the anchor. The presence or absence of a borehole liner is not thought to effect linear expansion or displacement of the heat-responsive element.

It has been an important object of this invention to provide a simple and efficient measuring system where the effects of temperature changes producing longitudinal thermal expansions of a low order may be sensed by inter-related components formed of materials having different but known and constant temperature affected relationships to each other; and where changes in lengths between the inter-related components can be converted to simple mathematical expressions which may then be translated into tabular data, graphs or, by the use of computers, into electronically processed data. A further object of the invention has been to provide such a system in which variations of temperature are continuously sensed over the entire length of the apparatus and the measurement courses are also automatically cancelled or nullified.

Stated differently, another important object of this invention has been the provision of a temperature responsive extensometer capable of and adapted to produce superior quantitive responses that establish the occurrence of and define thermally-induced rock and soil mass deformations. A still further object has been to provide such an extensometer where the potential temperature effects on the extensometer are of the same order of magnitude as the thermally-induced rock and soil mass deformation.

These and other objects of this invention will become apparent and fully comprehensible during the detailed description that follows in which is set forth one specific embodiment of this invention which is shown in the accompanying drawings.

BRIEF DESCRIPTION OF THE DRAWINGS

FIG. 1 is a side view of the temperature compensated extensometer of this invention showing it installed in a borehole in the earth, portions being broken away and omitted for convenience of illustration;

FIG. 2 is another side partial view, relatively larger, of the outer end of the extensometer;

FIG. 3 is a cross section in the plane 3—3 of FIG. 2;

FIG. 4 is an end view of two pair of transducers coupled to the functional components of the heat responsive element of the extensometer;

FIG. 5 is an enlarged side view of the outer end of the tube and rod components showing the manner in which transducers are associated therewith; and FIG. 6 is a cross section taken in the plane 6—6 of FIG. 2.

DETAILED DESCRIPTION OF THE DRAWINGS

Referring to FIG. 1, a borehole 10 has its entrance 12 at the excavation face 14 where it is surrounded by mortar pad 16 formed of concrete. A sturdy base plate 18 is anchored at the outer face of pad 16 by cast-in-place anchor members 20. The mortar pad 16 and the anchored plate 18 constitute means forming and providing a reference surface 22 in close proximity to the entrance to borehole 10 and is adjacent the outer end of the heat responsive elements 24,24. Plate 18 also supports on its inner face the outer end of the protective conduit 26. Cap or cover 28, secured to plate 18 encloses transducer equipment attached to the sensors at their external ends. Coupler 30 secures armored signal cable 32 to casing 18.

A heat-responsive element 24 comprises a tube 40 having rod 42 coaxially disposed therein. The distal or down-hole ends of the rod 42 and tube 40 of each element 24 are securely joined together and, at that end, fixedly and remotely anchored and secured in the surrounding material by anchor means 44. Down-hole anchor means may be of the well-known star-anchor type or the like, primarily a means capable of simply but securely engaging the borehole and wall remote from the entrance of the borehole.

Any heat induced movement of the components of an element 24 will be relative the anchor means 44 and also relative reference surface 22 adjacent the outer end of element 24. A pair of elements 24,24 pass through and are guided by bushings 25 (see FIG. 2).

Referring to FIG. 5, it will be seen that the outer end of each element 24 comprises bushing 46 surrounding the end of rod 42 to centralize it in tube 40 and tend to resist crushing as when tightly clamped. It is important that rod 42 be capable of free and unrestricted movement within tube 40, lubrication being desirable where such movement restrictions may occur.

It is important that each tube and rod assembly have disparate linear coefficients of expansion of about 2:1 greater to lesser. The actual ratio is determined and controlled by the choice of the materials chosen to form or produce either the rod or the tube. Metallic materials are of the first choice but non-metallic materials are also available for use. If one chooses for one component a metal selected from among aluminum and alloys thereof a suitable disparity is quite easily obtained by choosing and selecting the metal for the other component from copper and alloys thereof, brass being a readily available and ideal example.

Other choices may be made from among materials such as bronze, titanium and alloys thereof, invar, Super-Invar (a proprietary product of GURTEL STEEL, Fisher's, N.Y.). The range for disparity desired and the need for resistance to corrosion will affect the choice as between the various metals and as between metallic and non-metallic materials. Combinations of metallic and non-metallic materials may likewise be used.

Whereas in the preferred embodiment of the invention the choice lies with a brass rod within a titanium tube, in some cases the reverse may be preferable.

Under certain circumstances the rod and tube components of element 24 may be chosen from non-metallic materials, the graphite and/or silicon-based materials being appropriate choices. By the same token, the components may be chosen, one from a metallic source and the other from a non-metallic source. To repeat, the choices of the component materials to comprise an element 24 are primarily governed by there being a disparate linear coefficient of expansion between the materials chosen that suitably evidences thermally-induced movement in the borehole.

EXAMPLE ONE

Where the chosen tube 40 of element 24 was brass, the linear thermal coefficient of expansion was $11.1 \times 10^{-6}$ inches per inch per °F. as sensed by the transducer probe bearing on reference surface 22 at the entrance to the borehole. At the same instance if the rod material chosen is titanium having a thermal coefficient of expansion sensed at the out end of the rod of $5.1 \times 10^{-6}$ inches per inch per °F. The ratio between the two materials is, therfore, titanium rod to brass tube of 0.459:1.

Referring to FIG. 2, it will be seen that the outer end of each tube 40 is securely gripped by a clamp 50 which also engages the offset transducer 52. An axial transducer element 54 is securely engaged by secondary clamp 55 carried at the outer end of transducer 52. The clamps 50 and 52 are tighted about the tubes 40, the offset transducers 52 and axial tranducers 52 by screw means 56 in the manner shown in FIGS. 4 and 6.

The rods 42 at their outer ends are free to move in a ferrule 58 mounted in the outer extremity of each of the tubes 40.

Each rod 42 is associated with a transducer 54 by a probe 58 which transmits thereto movement of the rod due to thermal activity sensed by it in the borehole 10.

Probe 60 associated with each offset transducer 52 bears on the reference 22 as shown in FIG. 2 and transmits movement of each tube 40 to the transducer 52 secured in clamp 55. It will be seen that the probes 58, 58 and 60, 60 bear on their respective related rod ends and the reference surface.

It will be seen that in this system, by comparison with earlier systems using a single rod or wire to connect the borehole anchor to the measuring head, there is essentially a concentric arrangement of a rod 42 to anchor means deep in the borehole 10 and freely supported for movement at the mesuring head.

The materials chosen for the rod and tube combination are selected on the basis of their disparate coefficients of expansion. When such a system is heated, the rod and the tube in each unit will expand in the ratio of their individual coefficients of expansion.

It is desireable for effective operation that there be a sizeable difference in the linear coefficients of expansion for the two chosen materials. With the inner ends of the rods 42 and tubes 40 being securely anchored remotely in the borehole 10 and the same being of identical length, it will be appreciated that only the thermal linear displacement of a tube 40 will be sensed by an offset transducer 52, and only the thermal linear displacement of a rod 42 will be sensed by an axial transducer 54. Comparison of these disparate linear displacements sensed by the parallel transducers 52 and 54 transmitted by conductors 70 through cable 32 to appropriate electronic gear (not shown) provides the operator with accurate data of thermal factors underground.

Changes in the relative lengths of the tube 40 and rod 42 components of the instrument, which are related by simple mathematical expressions, can be represented either in tabular form, by graphs, or by factors introduced during electronic data processing, i.e. by computer methods. Not only are the fundamental data adjustments by this system greatly simplified, but variations automatically cancel out along the length of the measurement course—that is long borehole 10.

Differences in their respective lengths of elements between their anchors provide temperature readings at different points in the borehole 10. It is possible that more than two elements 24 may be installed in the borehole 10.

It will be apparent to those skilled in the art that variations of material choices and of construction may be deemed appropriate. All such as fall within the scope of the "doctrine of equivalents" as properly applied here are considered part and parcel of the invention as defined by the subjoined claims.

I claim:

1. A temperature-compensated borehole extensometer, comprising;

an elongated heat-responsive element formed of a tube having a rod coaxially disposed therein and distally secured thereto;

the tube and rod components of said element being formed of materials having disparate linear coefficients of expansion;

means to fixedly and remotely anchor the distal portion of said element in a borehole in the earth, the components of said element having freedom of movement relative each other and of the borehole over the length of said element between the anchored distal portion and the entrance to said borehole;

means forming a reference surface adjacent the outer end of said element and near the entrance of such borehole;

a first transducer fixed to said tube in parallel disposition and including a probe associated with said reference surface;

a second transducer fixedly associated with said first transducer and having a probe associated with the outer extremity of said rod; and means for comparing the responses of the first and second transducers to the presence or absence of heat affecting said elements.

2. The structure of claim 1 in which the disparate linear coefficient of expansion of said tube is greater than the coefficient of expansion of the rod.

3. The structure of claim 1 in which the disparate linear coefficient of expansion of said tube is less than the coefficient of expansion of the rod.

4. The structure of claim 2 in which the ratio of thermal expansion between the tube and the rod is at least 1:0.459.

5. The structure of claim 2 in which said ratio is at least 2:1.

6. The structure of claim 3 in which said ratio is at least 2:1.

7. The structure according to claim 2 in which the tube is formed of a metallic material selected from the group consisting of copper, brass and bronze, and the rod is formed of aluminum.

8. The structure of claim 1 in which the rod is formed of aluminum, and the tube is formed of a metallic material selected from the group consisting of copper, brass and bronze.

9. The structure of claim 1 in which the rod is formed of a metallic material selected from the group consisting of titanium, invar, "Carpenter 36", Invar, a product of GURTEL STEEL, Fisher's, N.Y.

10. The structure of claim 6 in which the tube is formed of brass.

11. The structure of claim 1 in which the rod is aluminum.

12. The structure of claim 6 in which the rod is formed of titanium.

13. The structure of claim 1 in which the tube and rod components of said element are formed of non-metallic materials.

14. The structure of claim 1 in which the tube component of said element is metallic and the rod components is non-metallic.

15. The structure according to claim 1 in which the tube component of said element is non-metallic and the rod component is metallic.

* * * * *